(12) United States Patent
Cantwell et al.

(10) Patent No.: US 7,835,288 B2
(45) Date of Patent: Nov. 16, 2010

(54) NETWORK SWITCH WITH ONBOARD DIAGNOSTICS AND STATISTICS COLLECTION

(75) Inventors: Larry Cantwell, Moorestown, NJ (US); Hee Lui, Medford, NJ (US); Ghanshyam Dave, Marlton, NJ (US)

(73) Assignee: OnPath Technologies Inc., Marlton, NJ (US)

( * ) Notice: Subject to any disclaimer, the term of this patent is extended or adjusted under 35 U.S.C. 154(b) by 174 days.

(21) Appl. No.: 12/167,068

(22) Filed: Jul. 2, 2008

(65) Prior Publication Data

US 2010/0002588 A1    Jan. 7, 2010

(51) Int. Cl.
*G06F 11/30* (2006.01)
(52) U.S. Cl. .................. 370/241; 370/244; 370/250; 370/352; 370/389
(58) Field of Classification Search .................. 370/241, 370/248, 244, 247
See application file for complete search history.

(56) References Cited

U.S. PATENT DOCUMENTS

| | | | | |
|---|---|---|---|---|
| 5,878,030 A | * | 3/1999 | Norris | 370/241 |
| 6,356,532 B1 | * | 3/2002 | Richardson et al. | 370/248 |
| 6,917,630 B1 | * | 7/2005 | Russell et al. | 370/532 |
| 7,245,587 B2 | * | 7/2007 | Phaal | 370/244 |
| 7,254,114 B1 | * | 8/2007 | Turner et al. | 370/244 |
| 2003/0112801 A1 | * | 6/2003 | Calle et al. | 370/389 |
| 2003/0118006 A1 | * | 6/2003 | Yang et al. | 370/352 |
| 2007/0058641 A1 | * | 3/2007 | Cicchetti et al. | 370/400 |
| 2007/0143465 A1 | | 6/2007 | Gonzalez et al. | 709/223 |

OTHER PUBLICATIONS

Inrange Technologies, "NetLook Installation/User's Guide," pp. 1-187, 2001.

* cited by examiner

*Primary Examiner*—Ricky Ngo
*Assistant Examiner*—Rasheed Gidado
(74) *Attorney, Agent, or Firm*—Morgan, Lewis & Bockius LLP

(57) ABSTRACT

The network switch is configured to enable monitoring of switched data. The network switch includes a housing and one or more port cards. Each port card has one or more physical ports and includes switching circuitry to selectively create a communication path between two physical ports. The network switch also includes packet analyzer circuitry, situated within the housing, to monitor data packets switched via a communication path between two physical ports without substantially degrading signal integrity of the data packets.

24 Claims, 11 Drawing Sheets

NETWORK SWITCH WITH ONBOARD DIAGNOSTICS AND STATISTICS COLLECTION

TECHNICAL FIELD

The disclosed embodiments relate generally to network switches, and more particularly, to methods and systems for collecting diagnostic and statistical data and providing integrated network diagnostic tools in a network switch.

BACKGROUND

Monitoring data packets transmitted through a network switch presents significant engineering challenges. For example, costly test equipment plugged into a port of a network switch impacts the signal integrity and latency of data packets and can only monitor a single port at a time. Also, a network administrator may desire to monitor a network during normal operation to identify over-utilization and under-utilization of network components and to identify nascent failures. As another example, diagnosing data center network problems can be difficult and expensive.

SUMMARY

According to some embodiments, a network switch is provided that enables monitoring of switched data. The network switch includes a housing and one or more port cards. Each port card has one or more physical ports and includes switching circuitry to selectively create a communication path between two physical ports. The network switch also includes packet analyzer circuitry, situated within the housing, to monitor data packets switched via a communication path between two physical ports without substantially degrading signal integrity of the data packets.

According to other embodiments, a method of monitoring switched data is performed in a network switch. The method includes creating a circuit connection between a first port of a plurality of ports in the network switch and a second port of the plurality of ports. Data packets received at the first port are forwarded to the second port through the circuit connection. Data packets forwarded through the circuit connection are monitored to collect performance data, without substantially degrading signal integrity of the data packets. The performance data is transmitted to a device external to the network switch for analysis.

According to yet other embodiments, a network switch includes means for creating a circuit connection between a first port of a plurality of ports and a second port of the plurality of ports and for forwarding data packets received at the first port to the second port through the circuit connection. The network switch also includes means for monitoring data packets forwarded through the circuit connection to collect performance data, without substantially degrading signal integrity of the data packets. The network switch further includes means for transmitting the performance data to a device external to the network switch for analysis.

BRIEF DESCRIPTION OF THE DRAWINGS

Like reference numerals refer to corresponding parts throughout the drawings.

DESCRIPTION OF EMBODIMENTS

Reference will now be made in detail to various embodiments, examples of which are illustrated in the accompanying drawings. In the following detailed description, numerous specific details are set forth in order to provide a thorough understanding of the present inventions. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Figure 1:
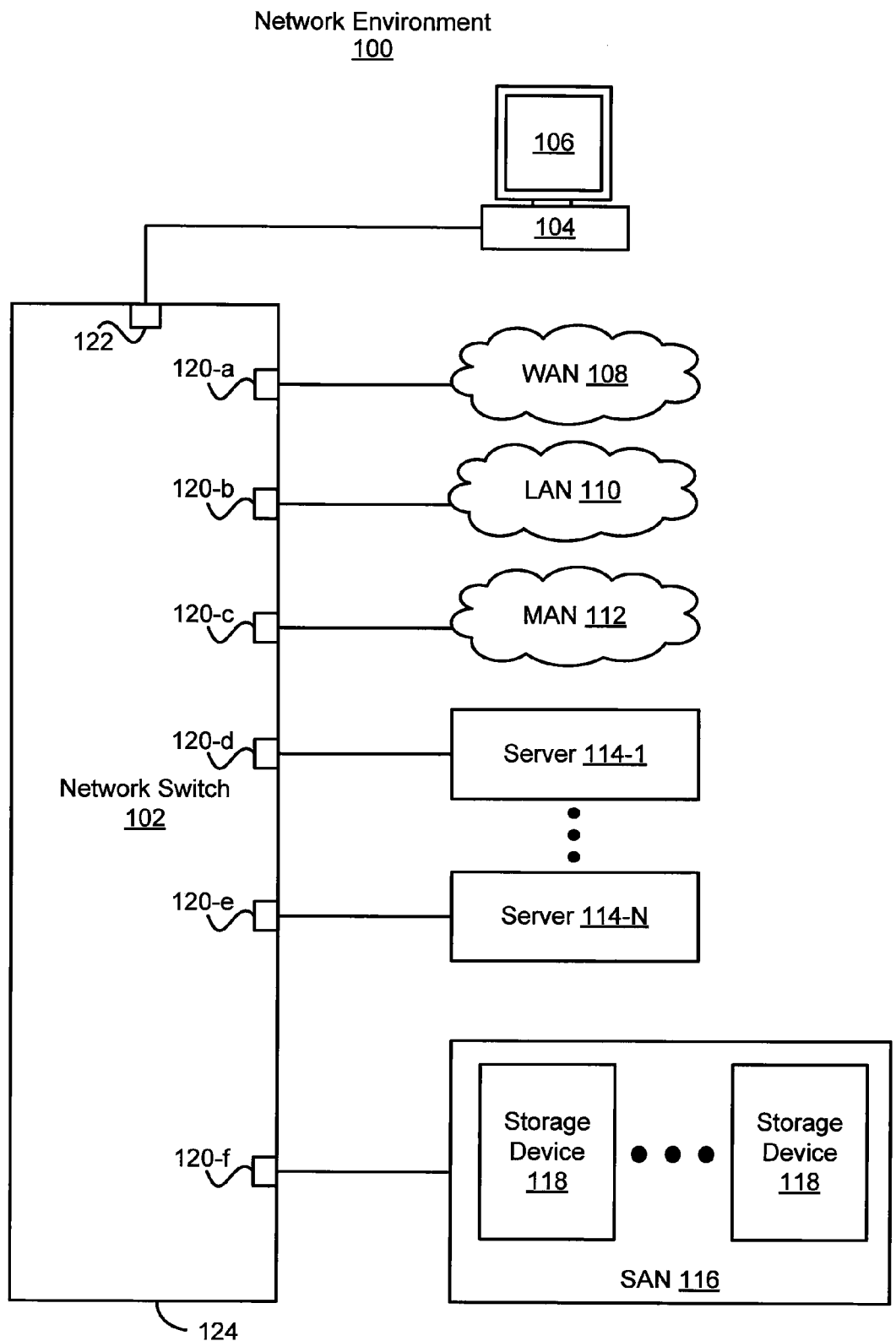
FIG. 1 is a block diagram illustrating a network environment including a network switch in accordance with some embodiments.

FIG. 1 is a block diagram illustrating a network environment 100 including a network switch 102 in accordance with some embodiments. The switch 102 provides connections between various electronic devices, such as one or more servers 114-1-114-N, storage devices 118, and/or other peripheral devices. In some embodiments, devices are coupled to the switch 102 through one or more networks, such as a wide-area network (WAN) 108, local-area network (LAN) 110, and/or metropolitan area network (MAN) 112. In some embodiments, the storage devices 118 are arranged in one or more storage area networks (SANs) 116. For example, a respective storage device 118 may correspond to a RAID array or to a logical unit number (LUN) of a RAID array.

Each device (e.g., server 114 or storage device 118) or network (e.g., WAN 108, LAN 110, MAN 112, or SAN 116) connects to the switch 102 through one or more physical ports ("ports") 120 in a housing 124. In some embodiments, the switch 102 includes at least 256 ports, or as many as 4096 ports or more. The ports 120 may support various data transmission protocols, such as Fibre Channel (FC), Ethernet, FCOE, SONET/SDH protocols, high-definition (HD) television, SDI, FICON, ESCON, iSCSI, and others. The ports 120 also may support various transmission rates (i.e., line rates), such as 1, 2, 4, or 8 Gbps. In some embodiments, a respective port 120 may be replaced with a wireless port.

Data frames or packets received at a respective port 120 are switched to at least one other port 120 for transmission to a corresponding destination device or devices. In some embodiments, the switch 102 is a physical layer switch that provides user-configurable dedicated communication paths between respective ports 120 (e.g., between an "input port" and one or more "output ports."). (The term "physical layer" refers to Layer 1 of the Open Systems Interconnect (OSI) model.) For example, a user at an external computer 104 may configure the switch 102 via a control port 122 to create a dedicated circuit connection between an input port and one or more output ports. Once the user has created a dedicated circuit connection, the circuit connection persists until the user subsequently reconfigures the switch 102 to disconnect the circuit connection. Physical layer switches thus are distinguishable from switches that determine the output port(s) for packets or frames by examining packet or frame addresses: in a physical layer switch, once a dedicated circuit connection has been created, data received at an input port is automatically directed to the corresponding output port(s). A physical layer switch provides an electronic patch panel that, when used as a replacement to a manual patch panel, eliminates having to rewire when reconfiguring network connections. Given their use as electronic patch panels, physical layer switches traditionally lack the intelligence to monitor data, collect statistics, and perform diagnostics. For example, physical layer switches traditionally lack the ability to examine frames or packets transmitted through a dedicated circuit connection in a switch.

The network switch 102 is internally configured to perform diagnostics and to capture statistics related to the performance of one or more ports 120 of the switch 102. Collected diagnostic and statistical data is reported to a computing device, such as a workstation, external to the network switch in response to an appropriate request from the external computing device, thus allowing network administrators to access the collected data. In some embodiments, the collected data is transmitted via the control port 122 to an external computer 104, which includes a monitor 106 for viewing the collected data in graphical form. Graphical displays of collected data are sometimes referred to as dashboard reports. The control port 122 thus functions as a monitoring port through which performance of the switch 102 can be monitored. In some embodiments, the external computer 104, through the control/monitoring port 122, can poll multiple ports 120 or every port 120 for collected data. For example, polling may be performed in a round-robin manner, such that a T-connection is established with each port in turn.

Figure 2:
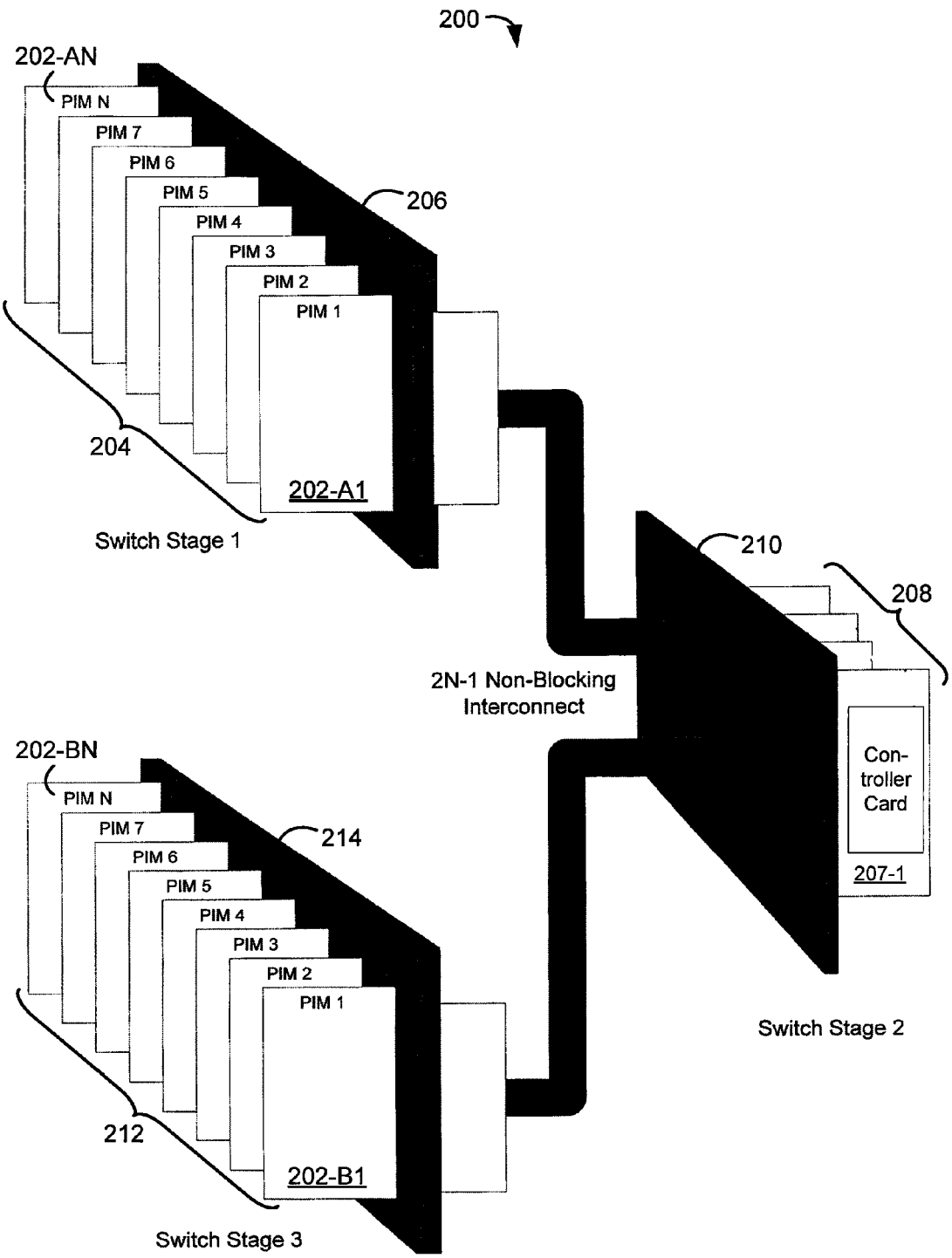
FIG. 2 is a block diagram illustrating a 3-stage switch architecture in accordance with some embodiments.

In some embodiments, the network switch 102 is implemented with a 3-stage architecture. FIG. 2 is a block diagram illustrating such a 3-stage switching architecture 200, which includes multiple port cards (sometimes referred to as Port Interface Modules or PIMs). In some embodiments, the switch 102 includes as many as 128 port cards or more. A first plurality 204 of port cards (PIM 1 202-A1-PIM N 202-AN) is connected to a midplane or backplane 206 and a second plurality 212 of port cards (PIM 1 202-B1-PIM N 202-BN) is connected to a midplane or backplane 214. A plurality 208 of controller cards 207 is connected to a midplane or backplane 210, which in turn is coupled to the midplanes/backplanes 206 and 214.

Each port card 202 includes one or more physical ports similar to the ports 120 described above in relation to FIG. 1. In some embodiments, each port card 202 has 8 ports, or 12 ports, or up to 32 ports, or as many as 48 or 64 ports or more. Each port card 202 also includes switching circuitry used in creating a communication path between an input port and a corresponding output port. If the output port is on the same port card 202 as the input port, the switching circuitry on the port card 202 creates a dedicated circuit connection between the input port and the output port. If, however, the output port is on a separate port card 202, a dedicated circuit connection between the input and output ports is created through the switching circuitry of the port card 202 for the input port, additional switching circuitry on a controller card 207, and the switching circuitry of the port card 202 for the output port. If an input port is to be coupled to multiple output ports (e.g., for multicasting), dedicated circuit connections are created through the switching circuitry of the port card 202 for the input port, one or more controller cards 207, and the port cards 202 for the output ports.

In other embodiments, every port card 202 is connected to a common midplane or backplane, to which the plurality 208 of controller cards 207 also may be connected. For example, in FIG. 2 the midplanes/backplanes 206, 210, and 214 may be implemented as a single common midplane or backplane.

In some embodiments, a respective port card 202 includes packet analyzer circuitry to monitor data frames or packets transmitted or received via one or more ports on the port card 202. In some embodiments, each port card 202 includes packet analyzer circuitry.

Figure 3:
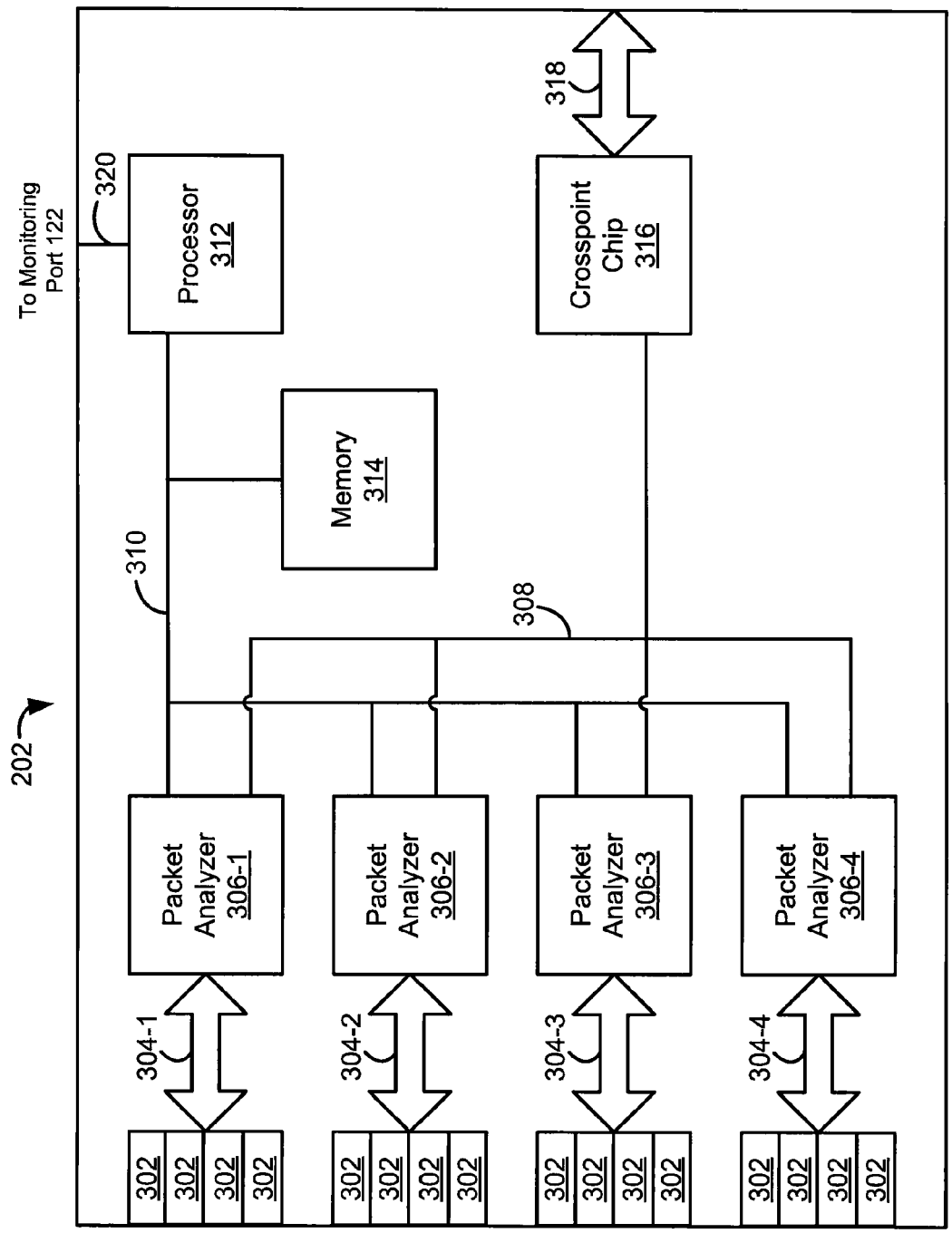
FIG. 3 is a block diagram illustrating a port card that includes packet analyzer circuitry in accordance with some embodiments.

FIG. 3 is a block diagram illustrating a port card 202 that includes packet analyzer circuitry 306 in accordance with some embodiments. The port card 202 includes a plurality of ports 302 through which data packets are transmitted and received. The ports 302 are coupled to packet analyzer circuitry 306 through signal lines 304. In some embodiments, each port 302 includes a serializer/deserializer (SerDes) to deserialize data received via the port 302 and to serialize data to be transmitted via the port 302. In some embodiments, each port 302 includes a GBIC-standard transceiver.

In some embodiments, the packet analyzer circuitry 306 includes one or more integrated circuits (ICs), such as field-programmable gate arrays (FPGAs) or application-specific integrated circuits (ASICs), mounted on the port card 202. In the example of FIG. 3, each packet analyzer IC 306 is coupled to a group of four ports 302: packet analyzer IC 306-1 is coupled to four ports 302 through signal lines 304-1, packet analyzer IC 306-2 is coupled to four ports 302 through signal lines 304-2, and so forth. The packet analyzer circuitry 306 can be enabled to gather performance statistics for one or more given data path in circuit at line rate in a substantially passive manner.

A switching IC 316 (i.e., "crosspoint chip" 316) implements the port card switching circuitry described with respect to FIG. 2. The packet analyzer ICs 306 forward data received from respective ports 302 to the crosspoint chip 316 and forward data received from the crosspoint chip 316 to appropriate output ports 302, via a data bus 308, in accordance with user-configured circuit connections.

The port card 202 also includes a processor 312 coupled to the packet analyzer ICs 306 via a performance data bus 310. Performance statistics and diagnostic data collected by the packet analyzer ICs 306 are forward to the processor 312, which serves as additional packet analyzer circuitry to collate the collected statistics and diagnostic data and forward the collated data for transmission to an external computer (e.g., computer 104, FIG. 1) that displays the statistics on a dashboard application (i.e., an application for displaying dashboard reports). For example, the processor 312 includes an interface to transmit the collated data via a bus 320 to a port (e.g., the monitoring port 122) to which the external computer is connected.

Furthermore, the monitoring port may be successively coupled to respective port cards and thereby to respective ports. For example, an external computer (e.g., computer 104, FIG. 1) in communication with the network switch 102 via the monitoring 102 may successively poll respective processors 312 on each port card 202. In some embodiments, this successive polling is performed in round-robin fashion. While polling a respective processor 312, the external computer may retrieve collated statistics and diagnostic data for each port 302 on the corresponding port card 202. In some embodiments, retrieval of collated data for respective ports 302 on the corresponding port card 202 is performed sequentially or in round-robin fashion.

In some embodiments, a memory 314 (e.g., a dual-port SRAM) stores collected performance statistics and diagnostic data. The memory 314 is coupled to the processor 312 and the packet analyzer ICs 306 via the performance data bus 310. In some embodiments, the memory 314 also stores traces captured in response to a trigger event such as an error condition. The captured trace includes data corresponding to the trigger event, such as data flowing through a port 302 coupled to a respective packet analyzer IC 306 when the trigger event occurs. For example, a captured trace may include the contents of one or more packets or frames associated with the trigger event. In some embodiments, the memory 314 is embedded within the packet analyzer ICs 306 and/or within the processor 312.

When a port card 202 is mounted in a network switch 102 (FIG. 1), the packet analyzer circuitry 306, processor 312, memory 314, and crosspoint chip 316 are all internal to the housing 104 (FIG. 1).

In some embodiments, instead of connecting packet analyzer ICs 306 to respective ports 302 on a port card 202, a packet analyzer IC is coupled to a monitoring port 122 (FIG. 1). For example, a packet analyzer IC may be located on a port card for the monitoring port. The monitoring port 122 may be selectively coupled (e.g., through a T-connection) to respective circuit connections between input and output ports to monitor data transmitted through the circuit connections.

By including the packet analyzer circuitry 306 within the network switch and internal to the port 302 and its associated receiver circuitry, the network switch is able to monitor data packets without substantially degrading their signal integrity, data rate, or latency. In some embodiments, delays resulting from the packet analyzer circuitry 306 are only on the order of tens of nanoseconds, or on the order of nanoseconds. For example, in some embodiments delays induced by the packet analyzer circuitry 306 are no more than 35 nanoseconds. Because the packet analyzer circuitry 306 is internal to the switch both physically and with respect to the transmitter and receiver circuitry at each port 302, the packet analyzer circuitry does not alter the characteristics of the transmission channels through which data packets are received at and transmitted from the switch. Since the characteristics of the transmission channels are not altered, signal integrity on the transmission channels is not degraded. This monitoring capability represents a significant advantage over diagnostic and performance characterization modules that are external to the network switch and plug into ports in the network switch. A module that plugs into a port in a network switch makes a serial connection with the transmission medium (e.g., a network cable) that otherwise would plug directly into the network switch, and thus alters the characteristics of the transmission channel and consumes switch ports. Furthermore, including packet analyzer circuitry 306 for multiple ports 302 and selectively coupling the circuitry 306 to a monitoring port 122 (FIG. 1) enables automated monitoring of multiple ports 302 and avoids having to connect bulky and expensive external test equipment to successive ports.

Figure 4:
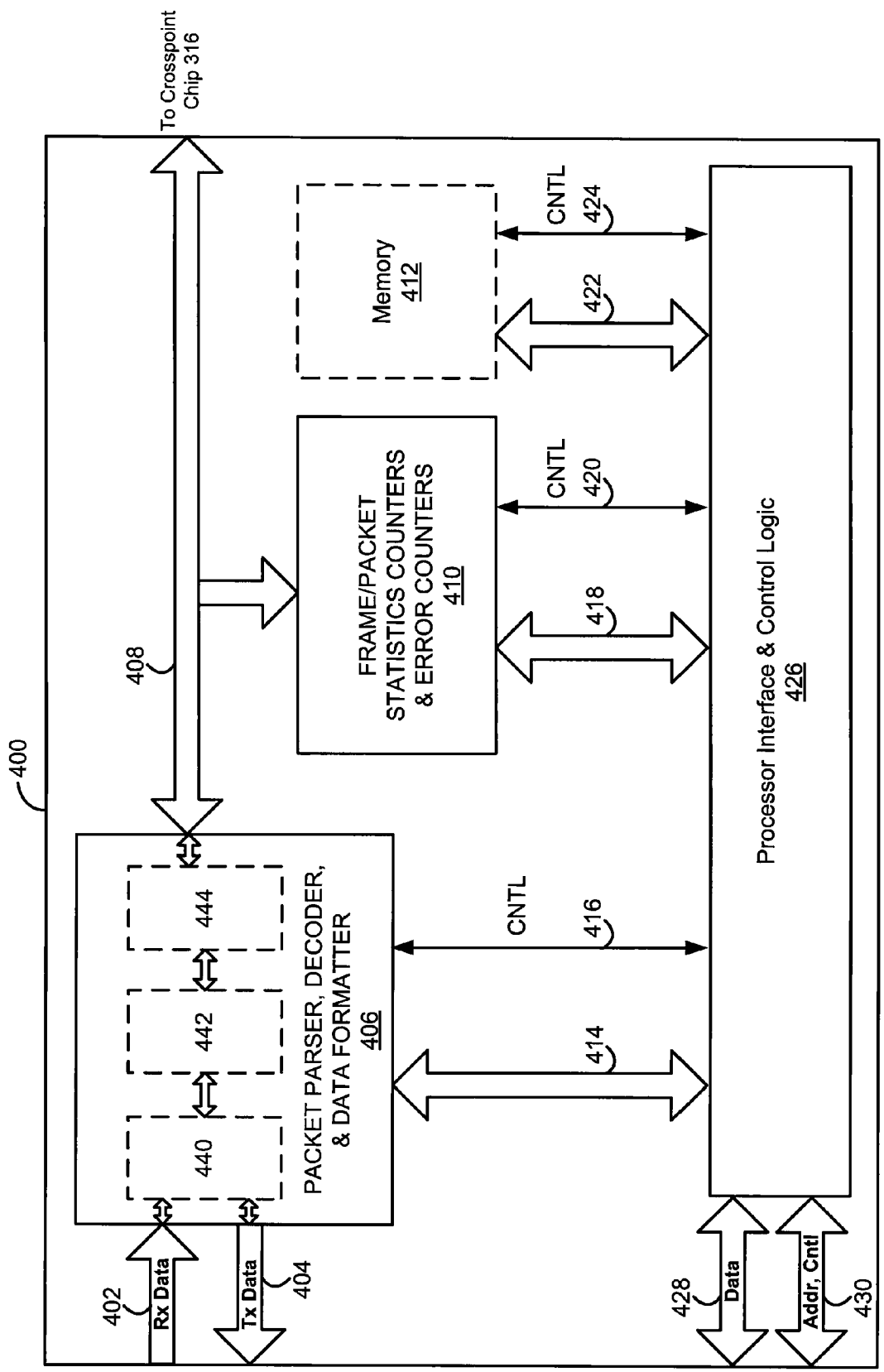
FIG. 4 is a block diagram illustrating functional elements of a packet analyzer integrated circuit in accordance with some embodiments.

FIG. 4 is a block diagram illustrating functional elements of a packet analyzer IC 400 in accordance with some embodiments. The packet analyzer 400 is an example of an implementation of the packet analyzer IC 306 (FIG. 3). A packet parser, decoder, and data formatter module 406 parses and decodes data packets received via a receive bus 402 and formats data for transmission via a transmit bus 404. The receive bus 402 and transmit bus 404 connect to signal lines 304 (FIG. 3) through corresponding leads on the packet analyzer IC 400. A bus 408 provides a path for data received from and transferred to the crosspoint chip 316 (FIG. 3); the bus 408 connects to the data bus 308 (FIG. 3) through corresponding leads on the packet analyzer IC 400. This arrangement ensures that negligible delay is introduced for monitored packets. While FIG. 4 shows the packet parser, decoder, and data formatter module 406 in series with the bus 408, in some alternate embodiments the module 406 is arranged in parallel with the bus 408, such that data is provided in parallel to the module 406 and the bus 408, further reducing any delay introduced for monitored packets.

The bus 408, in addition to connecting to the data bus 308 (FIG. 3), also provides data to counters 410, which include frame/packet statistics counters and error counters. In some embodiments, the counters 410 include, but are not limited to, one or more of the following counters:

counters that measure the latency of Fibre Channel reads and writes.
a Fibre Channel Exchange counter.
a total frame counter. In some embodiments, this counter counts FC frames on a port by incrementing once for each Start-of-Frame (SOF)/End-of Frame (EOF) pair detected. In some embodiments, the count of frames does not include ordered sets, port states, and primitive signals and does not include frames for which EOF is not detected due to abnormal frame termination.
an invalid transmit words counter. In some embodiments, this counter counts 8B/10B coding errors at FC-1 level on a port as reported by a corresponding SerDes.
a byte counter. In some embodiments, this counter counts the number of bytes (e.g., FC words×4) written to and/or read from a given LUN (Logical Unit Number) on a storage device. In some embodiments, a report may be generated to indicate the top LUNs (e.g., the top 25 LUNs) in terms of historical utilization. In some embodiments, the count is kept in units of MB/second.
a bytes-per-sequence counter to count the number of bytes (e.g., FC words×4) in a sequence.
a frames-per-sequence counter.
a timestamp counter. In some embodiments, this counter counts time in microseconds. For example, each increment corresponds to 1.2047 microseconds.
a sequence timeout counter. In some embodiments, this counter is started when a sequence opens (e.g., when a new FC Sequence ID is encountered). If the sequence does not close after a specified period of time, a sequence timeout is generated.
a SCSI abort counter that measures how often a protocol level ABORT was sent from a Host or Target.

Other counters in the counters 410 may include counters for port errors; counters for throughput errors such as primitive sequence protocol errors, errors due to frames that are too long, errors due to truncated frames, address ID errors, delimiter errors, disparity errors, and discarded frames; and counters for availability errors such as link resets, offline sequences, and link failures.

In some embodiments, a respective counter is cleared upon a read operation. In some embodiments, a respective counter is not incremented if an associated error condition exists. In some embodiments, software executed by the processor 312 (FIG. 3) polls respective counters at fixed intervals.

In some embodiments, counter values may be written to a memory 412 embedded in the packet analyzer IC 400. The memory 412 provides subsequent access to the stored counter values by respective counters or by the processor 312 (FIG. 3). In some embodiments the counter values stored in the memory 412 include interim counter values. For example, an interim value of a frames-per-sequence counter or bytes-per-sequence counter assigned to a particular Sequence ID may be written to the memory 412 for subsequent access when the assigned Sequence ID is encountered again. In another example, timestamp values (e.g., timestamps corresponding to when a sequence opens or closes) are written to the memory 412 for subsequent access.

In some embodiments, the counters 410 include multiple copies of a particular counter. For example, where a counter corresponds to a particular FC sequence, multiple copies of the counter may be available to enable counting of a particular metric for multiple sequences in parallel. In one embodiment, the counters 410 include 64 sequence timeout counters. In some embodiments, multiple copies of a particular counter are implemented using a memory with a depth equal to the number of copies and a width equal to the size of the counter (e.g., a 64 words×16 bit memory for 64 copies of a 16-bit counter).

Processor interface and control logic 426 provides an interface with the processor 312 through a data bus 428 and address/control bus 430, which connect to the performance data bus 310 through corresponding leads on the IC 400. In some embodiments the processor interface and control logic 426 provides an MDIO interface and the busses 428, 430, and 310 are MDIO busses. The processor interface and control logic is coupled to functional elements 406, 410, and 412 through respective busses 414, 418, and 422 and through respective control signal lines 416, 420, and 424.

Monitoring counters for multiple respective ports in a network switch allows a network administrator to identify over-utilized, under-utilized, and defective network components. Furthermore, by tracking counter values over time, periods of over-utilization or under-utilization can be identified and defects can be identified before they result in full-blown outages. Because the counters are integrated into the network switch, the network administrator is able to collect and analyze performance data for a network switch without expensive and bulky test equipment.

In some embodiments, in addition to collecting statistics, the packet analyzer IC 400 includes circuitry to enable protocol trace capture in response to a trigger condition, such as an error condition or a user-defined event. Examples of error conditions that may serve as trigger conditions include the error types listed above with regard to the counters 410. Furthermore, in some embodiments the packet analyzer IC 400 includes circuitry to generate test sequences for transmission to a device external to the network switch and to verify data received from the external device in response to the test sequences.

Figure 5:
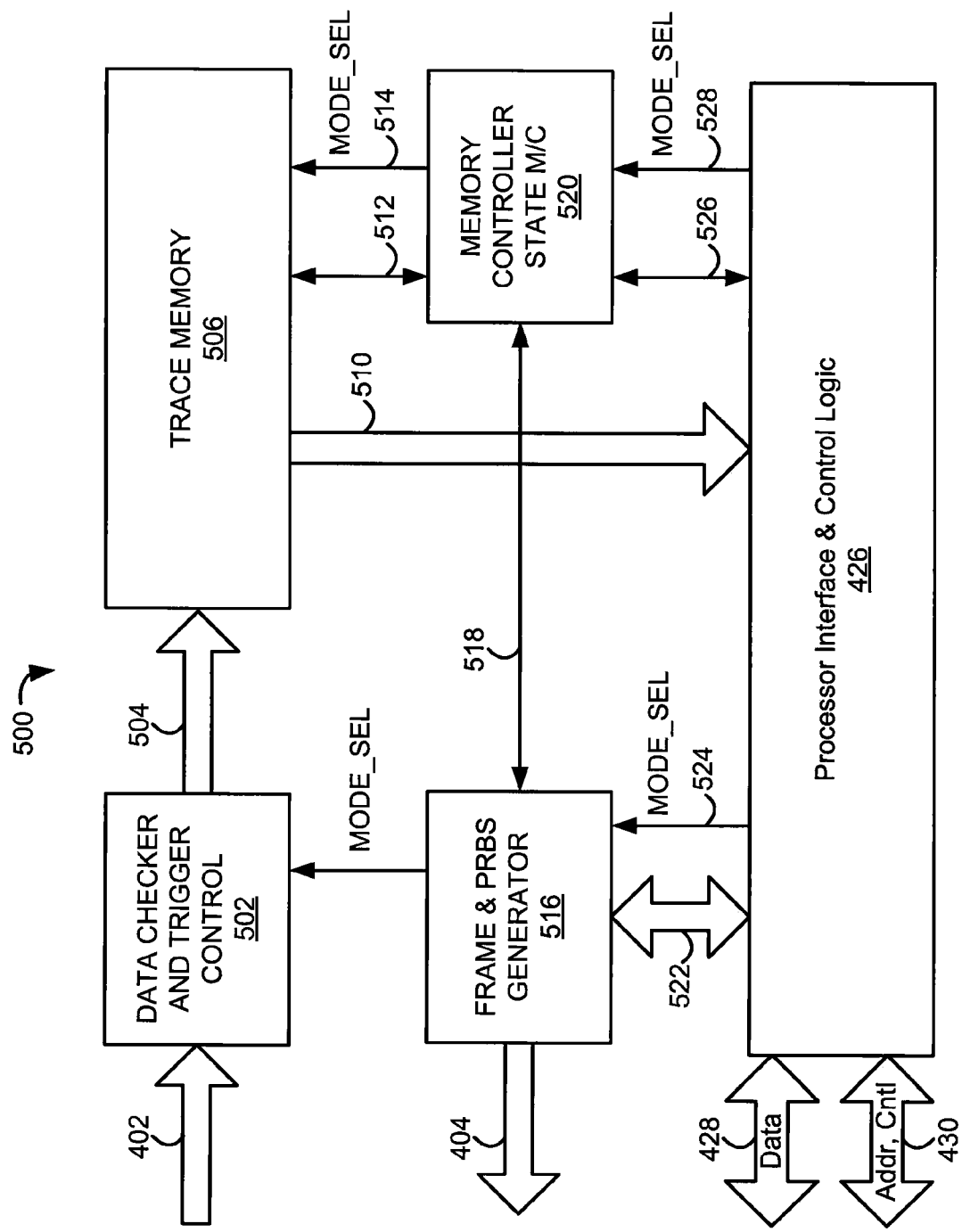
FIG. 5 is a block diagram illustrating circuitry for capturing traces and generating test sequences in accordance with some embodiments.

FIG. 5 is a block diagram illustrating circuitry 500 for capturing traces and generating test sequences in accordance with some embodiments. While the circuitry 500 is described as being implemented in a packet analyzer IC 400, in some embodiments the circuitry 500 is separately implemented on a port card or elsewhere in a network switch.

In FIG. 5, a frame and pseudo-random binary sequence (PRBS) generator 516 in communication with a memory controller state machine 520 provides test pattern sequences and test data frames via the transmit bus 404 to a port (e.g., a port 302, FIG. 3) for transmission to a target device external to the network switch. In some embodiments, generation of test pattern sequences and test data frames is enabled through the processor interface and control logic 426 (FIGS. 4 and 5) in response to an instruction from the processor 312 (FIG. 3) to place one or more respective ports 302 (FIG. 3) in a test mode. The instruction from the processor 312 (FIG. 3) results from a command received from a device external to the network switch (e.g., from a computer 104, FIG. 1). The processor 312 also may write to and read from the frame and PRBS generator 516 via a bus 522 and the processor interface and control logic 426 (FIGS. 4 and 5). This allows the user to create custom data patterns which they can inject into the network to test at line rate.

In some embodiments the frame and PRBS generator 516 includes a credit memory for storing credits associated with credit based flow control.

Data packets received from the target device in response to the transmitted test sequences are verified to check that their contents match the expected data. In some embodiments, the module 406 (FIG. 4) includes verification circuitry to perform this verification and provides an error notification to the control logic 426 if an error is detected. In some embodiments, the verification circuitry includes a bit error counter to count the number of bit errors detected and thus to enable calculation of a bit error rate (BER). In some embodiments, the verification circuitry includes a PRBS generator checker corresponding to the PRBS used to generate the test sequences. In some embodiments the verification circuitry compares frame data generated by and stored in the frame and PRBS generator 516 to received frame data.

In some embodiments, testing a network switch involves generating billions of test sequences over hours of testing. Any errors during this extended test period, or any test period, should be analyzed to identify the root cause of the failure. Accordingly, the circuitry 500 is configured to enable capture of traces associated with error conditions. In some embodiments the processor interface and control logic 426 (FIGS. 4 and 5) includes trigger control logic that instructs the trigger control circuitry 502 to capture a trace of a frame or frames corresponding to the detected error and to store the captured trace in the trace memory 506. The processor 312 (FIG. 3) can read captured traces via a bus 510 and the interface 426 (FIGS. 4 and 5), and provide the captured traces to a user at an external computer (e.g., computer 104, FIG. 1), thus aiding the user in debugging the network.

In some embodiments, operation of the trigger control circuitry 502 and trace memory 506 is not limited to data verification in a test mode. Instead, trigger conditions may be defined to capture traces during regular operation. For example, trigger conditions may be defined based on the values of one or more of the counters 410 (FIG. 4).

In some embodiments, trigger conditions are user-definable and may be enabled and disabled by commands provided to the network switch from an external computer (e.g., computer 104, FIG. 1). In some embodiments, trigger conditions may be defined based on one or more of the counters 410 (FIG. 4). For example, a trigger condition may be defined to occur when a counter (e.g., an error counter such as an invalid CRC counter or an invalid transmit word counter) increments, thus enabling capture of a trace corresponding to the condition (e.g., error condition) that caused the counter to increment. In another example, a trigger condition may be defined to occur when a counter reaches a defined value (e.g., a user-defined value). The processor interface and control logic 426 implements user-defined trigger conditions based on instructions received, via the processor 312 (FIG. 3), from an external computer (e.g., computer 104, FIG. 1).

Because the packet analyzer circuitry 400 (FIG. 4) and data generation/trace capture circuitry 500 are internal to the network switch, data monitoring and collection is performed in a secure fashion. In some embodiments, access to collected data is limited to users granted password-protected access. For example, the processor 312 (FIG. 3) may be programmed to require password verification before data is forwarded (e.g., via a monitoring port 122, FIG. 1) an external computer (e.g., computer 104, FIG. 1).

Figure 6A:
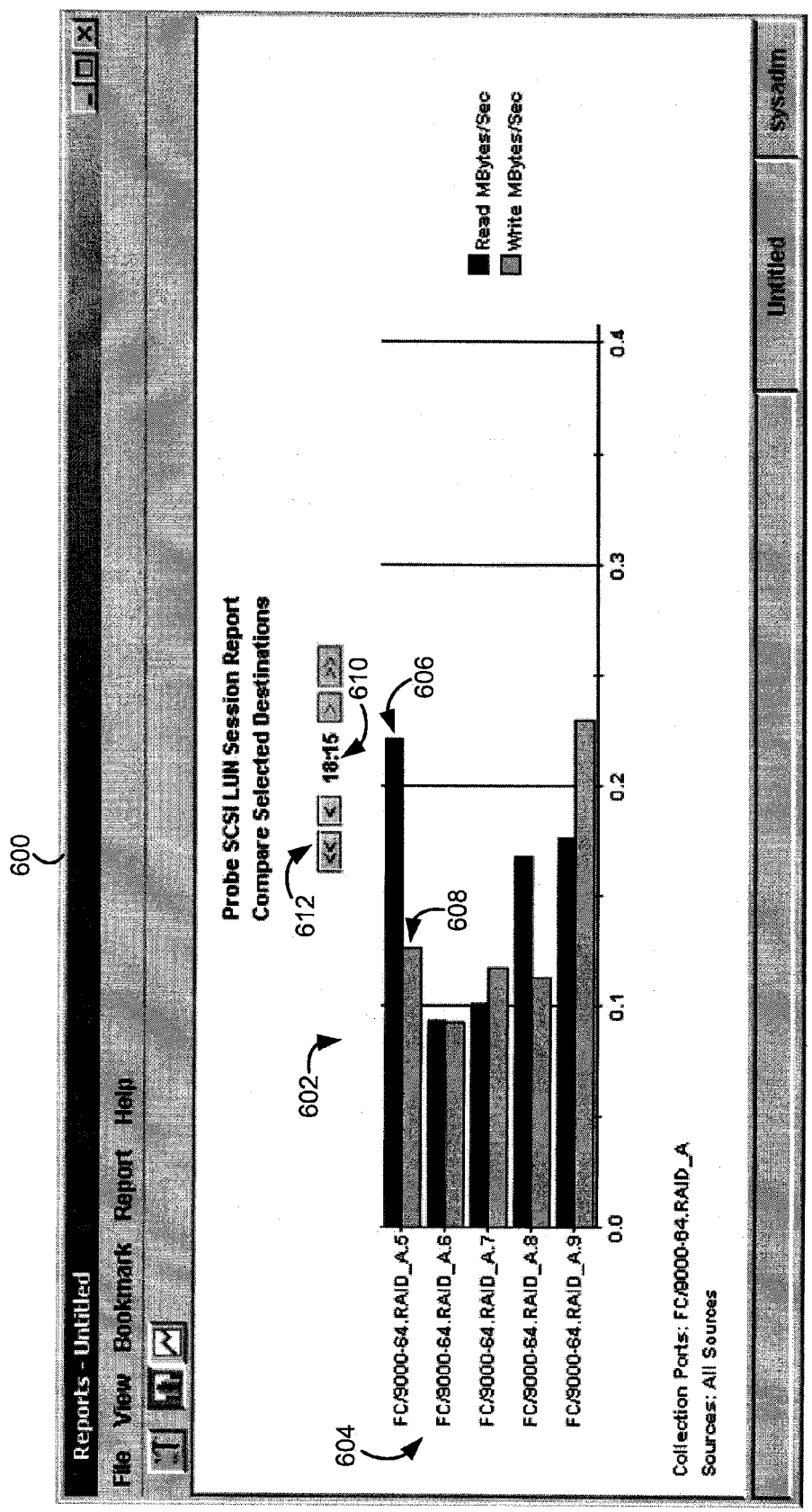
FIGS. 6A-6D illustrate screenshots of dashboard displays generated from performance data collected from a network switch in accordance with some embodiments.

FIGS. 6A-6D are examples of screenshots of dashboard displays generated from performance data collected from a network switch in accordance with some embodiments. FIG. 6A illustrates a user interface 600 displaying a graph 602 of traffic rates of SCSI read operations 606 and write operations 608 for various storage location destinations 604 (e.g., for various storage devices 118, FIG. 1). The traffic rates are measured in Mbytes/second and are reported for a particular point in time 610. Arrows icons 612 allow a user to select a new point in time 610, in response to which the graph 602 is dynamically updated.

Figure 6B:
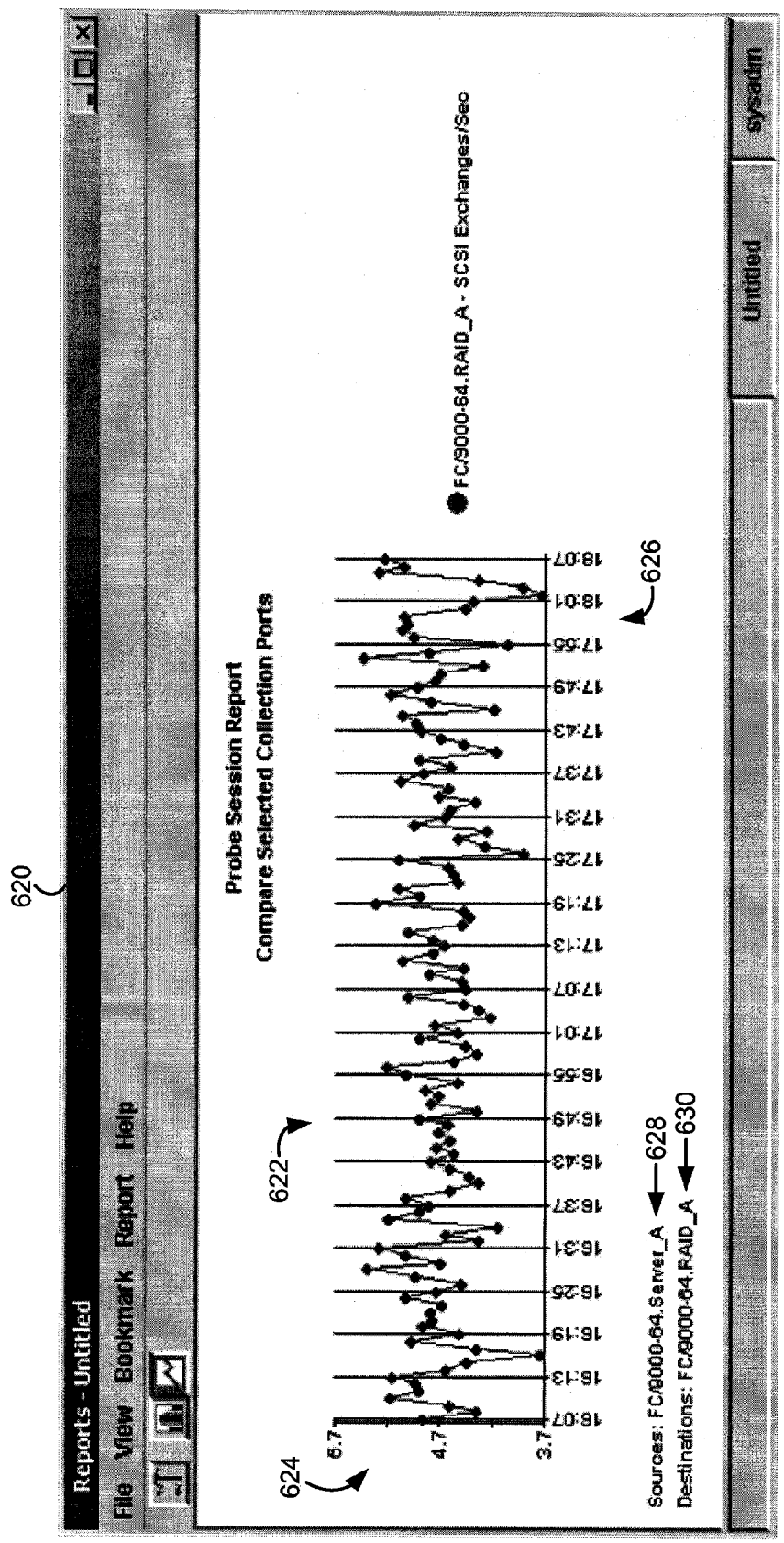

FIG. 6B illustrates a user interface 620 displaying a graph 622 of SCSI exchanges/second 624 versus time 626 for a particular source 628 (e.g., a server 114, FIG. 1) and a particular destination 630 (e.g., a storage location 118, FIG. 1). The graph 622 thus provides utilization information over time for a pair of devices communicating via a network switch.

In some embodiments a dashboard display may show a histogram of the sizes of exchanges for a particular source 628 or destination 630.

Figure 6C:
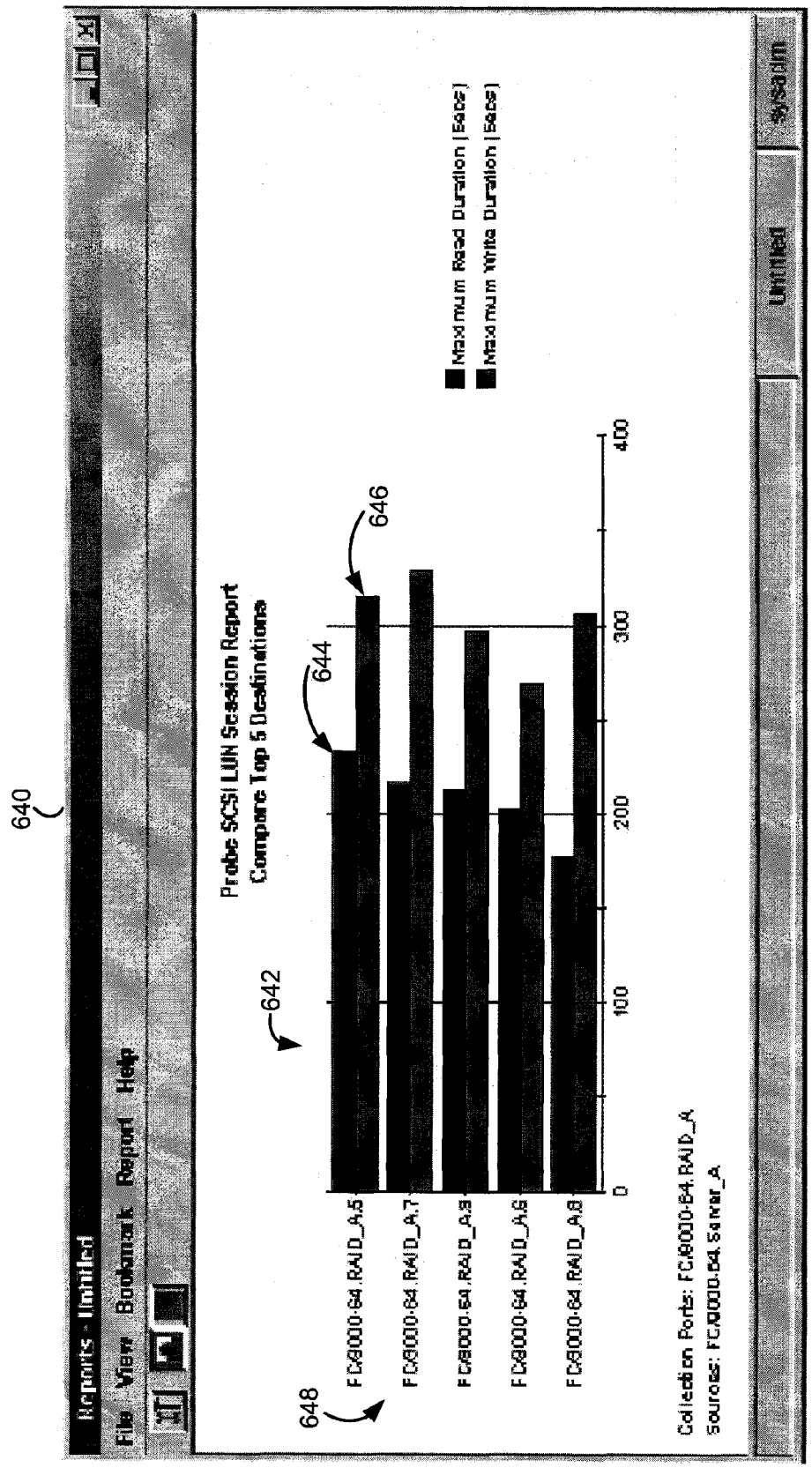

FIG. 6C illustrates a user interface 640 displaying a graph 642 of maximum durations (measured in seconds) for read operations 644 and write operations 646 for various storage location destinations 648 (e.g., for various storage devices/LUNs 118, FIG. 1). The maximum read durations 644 and write durations 646 are displayed for each of the top five destinations 648 connected to a network switch, as ranked by utilization.

Figure 6D:
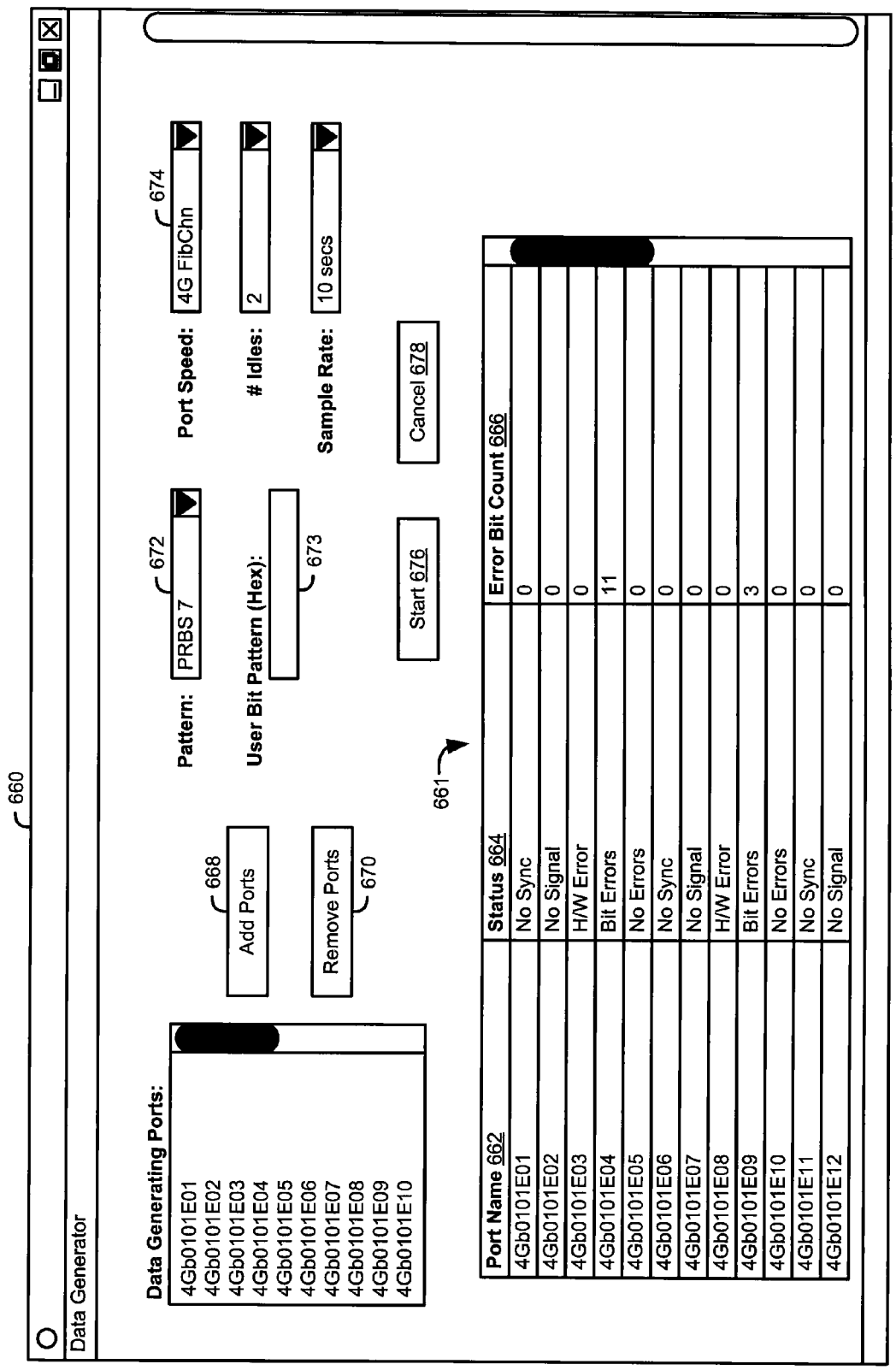

FIG. 6D illustrates a user interface 660 displaying a chart 661 showing a status 664 and bit error count 666 of various ports 662. The chart 661 shows the results of transmitting test sequences from the frame and PRBS generator 516 (FIG. 5) and verifying data received in response to the test sequences. Drop-down menus 672 and 674 allow the user to select a pattern for the test sequences and a port speed for the ports transmitting the test sequences respectively. Alternatively, the user may specify a pattern using hexadecimal notation in the text input field 673. "Add ports" icon 668 and "remove ports" icon 670 allow the user to add and remove ports under test. "Start" icon 676 allows the user to start the testing process and "cancel" icon 678 allows the user to end the testing process.

Attention is now directed to methods of collecting performance data in a network switch.

Figure 7A:
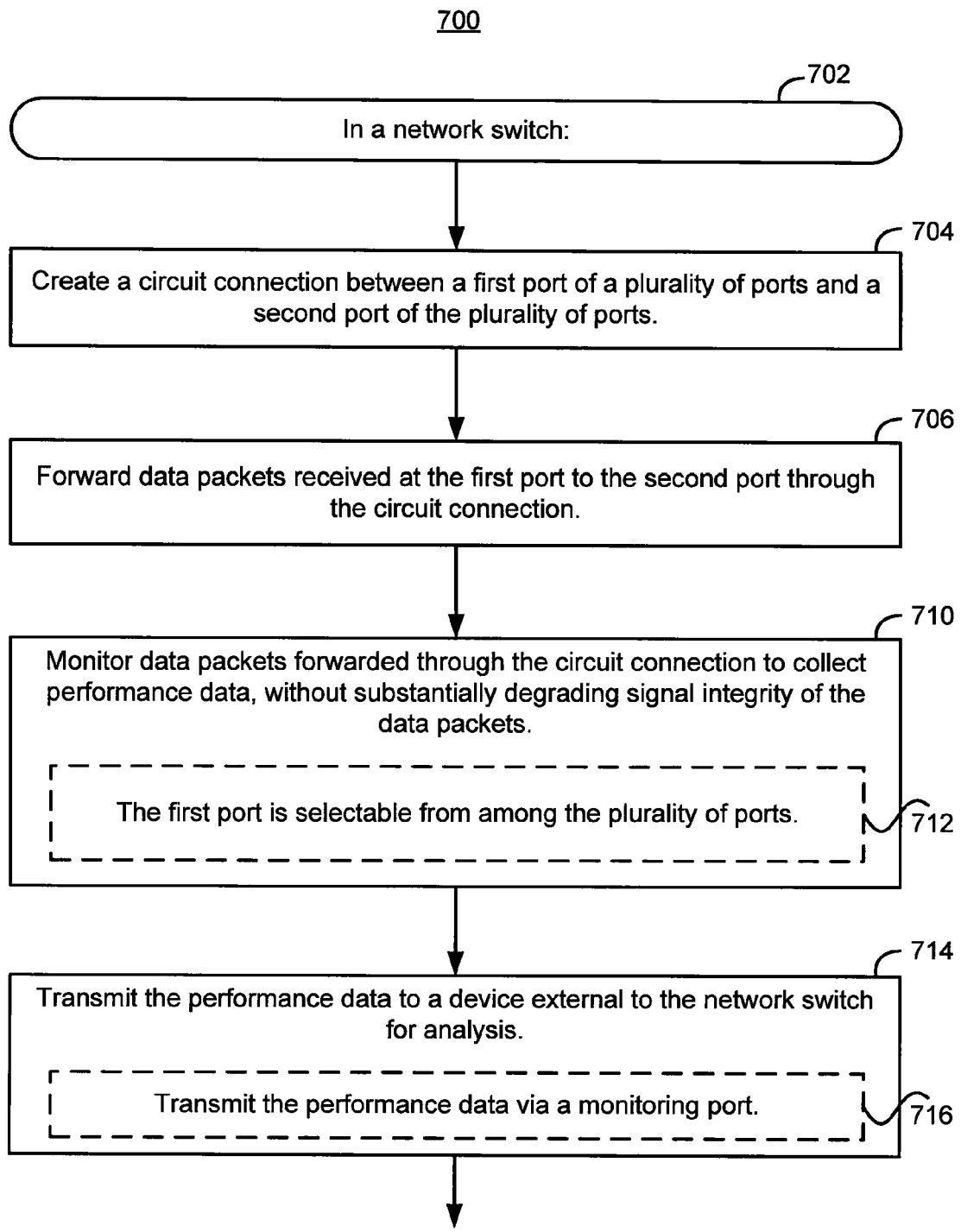
FIG. 7A is a flow diagram illustrating a method of monitoring switched data in accordance with some embodiments.

FIG. 7A is a flow diagram illustrating a method 700 of monitoring switched data in accordance with some embodiments. The method 700 is performed (702) in a network switch (e.g., network switch 102, FIG. 1, which in some embodiments is a physical layer switch). In the method 700, a circuit connection is created (704) between a first port (e.g., a port 120, FIG. 1) of a plurality of ports in the network switch and a second port (e.g., another port 120, FIG. 1) in the plurality of ports. In some embodiments, the circuit connection is created at the physical layer. In an example in which the first and second ports are on a common port card 202, the circuit connection is created through a crosspoint chip 316 (FIG. 3) on the common port card 202. In an example in which the first and second ports are on separate port cards 202, the circuit connection is created through crosspoint chips 316 on each port card 202 as well as through a controller card 207 (FIG. 2).

Data packets received at the first port are forwarded (706) to the second port through the circuit connection.

Data packets forwarded through the circuit connection are monitored (710) to collect performance data. Monitoring of the data packets is performed without substantially degrading the signal integrity of the data packets.

In some embodiments, the first port is selectable (712) from among the plurality of ports, allowing the user to select the port and corresponding circuit connection to be monitored. In some embodiments, monitoring data packets includes tapping the circuit connection. In some embodiments, the circuit connection is tapped with a T-connection coupling the circuit connection to another port (e.g., another port 120 or a monitoring port 122, FIG. 1).

In some embodiments, monitoring data packets includes detecting a trigger condition (e.g., an error condition) and, in response to the trigger condition, capturing a trace. For example, a trace may be captured using trigger control 502 and trace memory 506 in response to a trigger condition defined via control logic 426 (FIG. 5). In some embodiments the trigger condition is user-definable.

In some embodiments, monitoring the data packets includes recording a count of frames, bytes, invalid words (e.g., invalid transmit words), and/or CRC errors. These counts may be recorded, for example, using counters 410 (FIG. 4). In some embodiments, separate counts of frames or bytes are recorded for distinct sequences.

In some embodiments, monitoring the data packets includes calculating frame rates, traffic rates, link state rates, and/or exchange rates. These rates may be calculated, for example, by a processor 312 (FIG. 3) based on data from counters in the counters 410 (FIG. 4).

In some embodiments, monitoring the data packets includes determining timed lengths of read or write operations directed to an external storage device (e.g., a storage device 118 in a SAN 116, FIG. 1).

The performance data is transmitted (714) to a device external to the network switch for analysis. In some embodiments, the performance data is transmitted (716) via a monitoring port (e.g., port 122, FIG. 1) to a device (e.g., computer 104, FIG. 1) coupled to the monitoring port.

The method 700 thus provides users such as network administrators with data for analyzing the performance of a network switch. While the method 700 includes a number of operations that appear to occur in a specific order, it should be apparent that the method 700 can include more or fewer operations, which can be executed serially or in parallel, an order of two or more operations may be changed, and/or two or more operations may be combined into a single operation. For example, operations 704, 706, 710, and 714 may be performed in parallel during operation of a network switch.

Figure 7B:
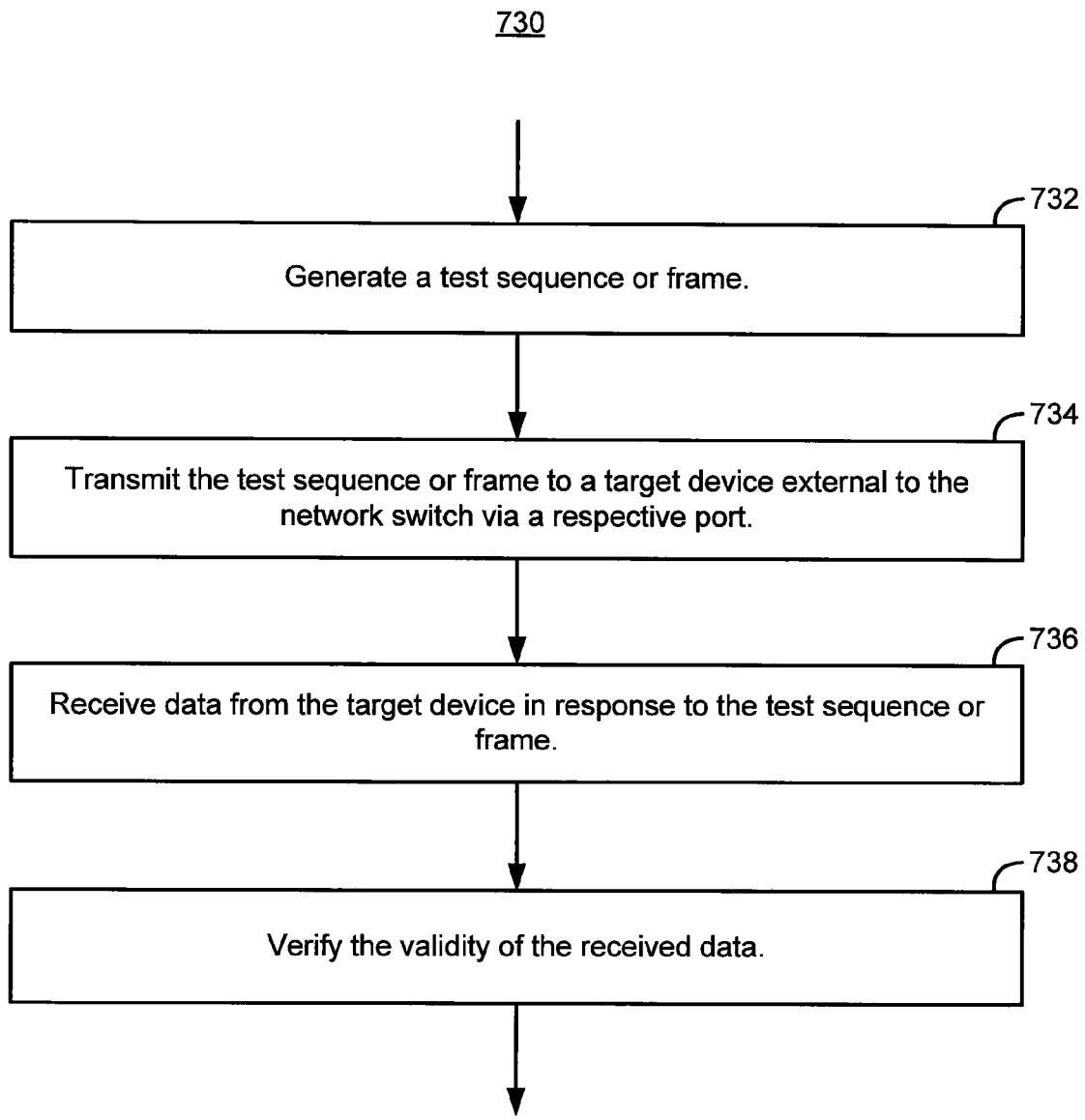
FIG. 7B is a flow diagram illustrating a method of testing a network switch in accordance with some embodiments.

FIG. 7B is a flow diagram illustrating a method 730 of testing a network switch in accordance with some embodiments. In some embodiments the method 730 is performed in conjunction with the method 700 (FIG. 7A). For example, a network switch may perform the method 700 in an operating mode and then be placed in a test mode to perform the method 730.

Once in the test mode, the network switch generates (732) a test sequence or frame. For example, circuitry 500 (FIG. 5) on a port card 202 (FIG. 3) generates the test sequence or frame. The test sequence or frame is transmitted (734) to a target device (e.g., a storage device 118 or server 114, FIG. 1) external to the network switch via a respective port. Data is received (736) from the target device in response to the test sequence or frame. The network switch verifies (738) the validity of the received data. For example, verification circuitry on the port card for the respective port verifies the received data. In some embodiments, verifying the validity of the received data includes recording a count of bit errors in the received data.

The method 730 thus permits testing of a network switch without external test equipment. While the method 730 includes a number of operations that appear to occur in a specific order, it should be apparent that the method 730 can include more or fewer operations, which can be executed serially or in parallel, an order of two or more operations may be changed, and/or two or more operations may be combined into a single operation. For example, operations 732, 734, 736, and 738 may be performed in parallel during operation of a network switch in a test mode.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A physical layer switch configured to enable monitoring of switched data, comprising:
   a housing;
   one or more port cards, each having one or more physical ports, wherein each port card includes switching circuitry to selectively create a communication path at the physical layer between two physical ports;
   packet analyzer circuitry, situated within the housing, to monitor data packets switched via the communication path without substantially degrading signal integrity of the data packets; and
   a plurality of controller cards, situated within the housing, to selectively couple a first port card of the one or more port cards to a second port card of the one or more port cards, the one or more port cards and the plurality of controller cards being configurable to create a dedicated path between a physical port connected to the first port card and a physical port connected to the second port card;
   wherein the packet analyzer circuitry is selectively coupled to the dedicated path.

2. The physical layer switch of claim 1, further comprising a monitoring port in the housing, the monitoring port coupled to the packet analyzer circuitry, the packet analyzer circuitry including an interface to transmit, via the monitoring port, data collected by monitoring data packets.

3. The physical layer switch of claim 1, further comprising a monitoring port card having a monitoring port to transmit data collected by monitoring data packets, wherein the packet analyzer circuitry comprises analysis circuitry situated on the monitoring port card and selectively coupled via a T-connection to the dedicated path between a physical port connected to the first port card and a physical port connected to the second port card.

4. The physical layer switch of claim 1, wherein the packet analyzer circuitry comprises analysis circuitry situated on the first port card, the physical layer switch further comprising a monitoring port, selectively coupled to the analysis circuitry situated on the first port card, to transmit data collected by the analysis circuitry situated on the first port card.

5. The physical layer switch of claim 1, wherein a respective physical port on a respective port card of the one or more port cards is selectively configurable as a monitoring port to transmit data collected by monitoring data packets.

6. The physical layer switch of claim 5, wherein the packet analyzer circuitry comprises analysis circuitry situated on the respective port card and selectively coupled via a T-connection to the dedicated path between a physical port connected to the first port card and a physical port connected to the second port card.

7. The physical layer switch of claim 5, wherein:
   the packet analyzer circuitry comprises analysis circuitry situated on the first port card; and
   the respective physical port is selectively coupled to the analysis circuitry situated on the first port card, to transmit data collected by the analysis circuitry.

8. The physical layer switch of claim 1, wherein the packet analyzer circuitry introduces substantially no delay for the monitored data packets.

9. The physical layer switch of claim 1, wherein the packet analyzer circuitry comprises an integrated circuit mounted on a respective port card of the one or more port cards.

10. The physical layer switch of claim 9, wherein the integrated circuit is a field-programmable gate array (FPGA) or application-specific integrated circuit (ASIC).

11. The physical layer switch of claim 9, wherein the integrated circuit is configured to selectively monitor, at line rate, data packets transmitted or received via each physical port of the respective port card.

12. The physical layer switch of claim 1, wherein the packet analyzer circuitry comprises:
   trigger circuitry to detect a trigger condition and capture a trace in response to the trigger condition; and
   trace memory to store the captured trace.

13. The physical layer switch of claim 12, wherein the trigger condition is user-definable.

14. The physical layer switch of claim 12, wherein the trigger condition corresponds to an error condition.

15. The physical layer switch of claim 1, wherein the packet analyzer circuitry is configured to characterize bit error rate (BER).

16. The physical layer switch of claim 1, wherein the packet analyzer circuitry comprises a Fibre Channel exchange counter.

17. The physical layer switch of claim 1, wherein the packet analyzer circuitry comprises a frames-per-sequence counter or a bytes-per-sequence counter.

18. The physical layer switch of claim 1, wherein the packet analyzer circuitry includes timing circuitry to determine latency of read or write operations directed to an external storage device.

19. The physical layer switch of claim 1, further comprising a data generator to generate a test sequence or frame and transmit the test sequence or frame via a respective physical port.

20. The physical layer switch of claim 19, wherein the packet analyzer circuitry includes verification circuitry, operable during a test mode of operation, to verify validity of data received in response to transmitting the test sequence or frame.

21. The physical layer switch of claim 19, wherein the data generator and at least a portion of the packet analyzer circuitry are implemented in a common integrated circuit.

22. A physical layer switch configured to enable monitoring of switched data, comprising:
   a housing;
   one or more port cards, each having one or more physical ports, wherein each port card includes switching circuitry to selectively create a communication path at the physical layer between two physical ports; and packet analyzer circuitry, situated within the housing, to monitor data packets switched via the communication path without substantially degrading signal integrity of the data packets, the packet analyzer circuitry comprising a Fibre Channel exchange counter.

23. A physical layer switch configured to enable monitoring of switched data, comprising:

a housing;

one or more port cards, each having one or more physical ports, wherein each port card includes switching circuitry to selectively create a communication path at the physical layer between two physical ports; and packet analyzer circuitry, situated within the housing, to monitor data packets switched via the communication path without substantially degrading signal integrity of the data packets, the packet analyzer circuitry comprising a frames-per-sequence counter or a bytes-per-sequence counter.

24. A physical layer switch configured to enable monitoring of switched data, comprising:

a housing;

one or more port cards, each having one or more physical ports, wherein each port card includes switching circuitry to selectively create a communication path at the physical layer between two physical ports; and packet analyzer circuitry, situated within the housing, to monitor data packets switched via the communication path without substantially degrading signal integrity of the data packets, the packet analyzer circuitry comprising timing circuitry to determine latency of read or write operations directed to an external storage device.

* * * * *